Sept. 16, 1941.   J. G. VERGOBBI   2,255,953
ORNAMENTAL WRAPPING SHEET AND METHOD OF MAKING THE SAME
Filed Oct. 14, 1938
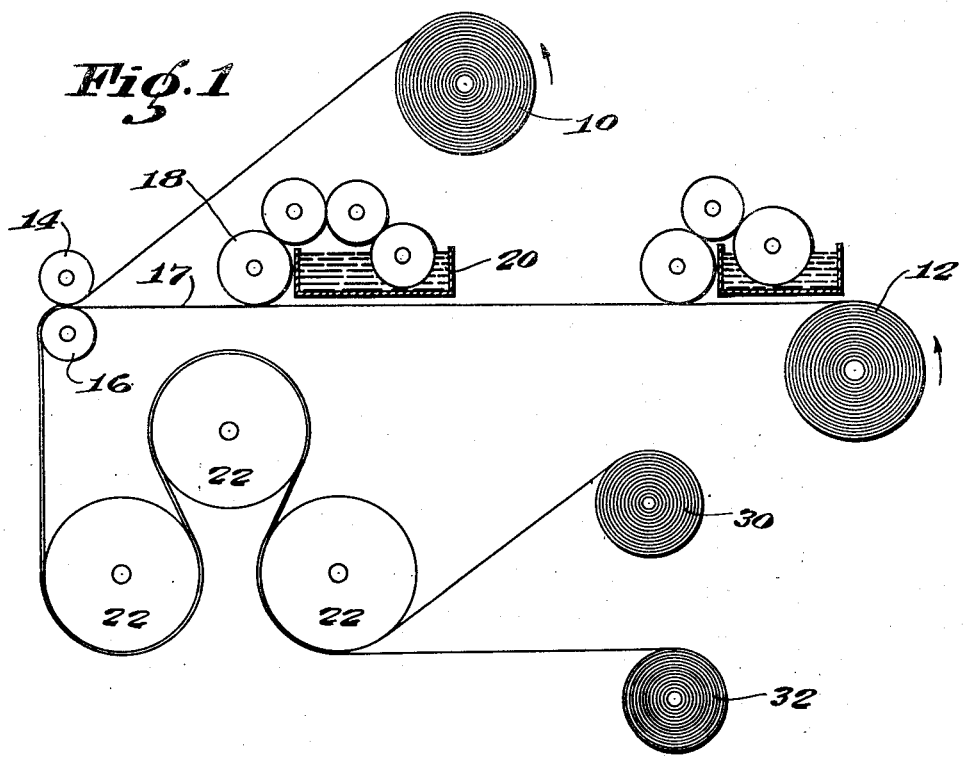
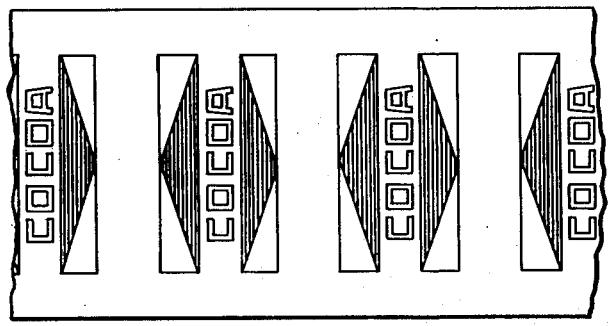
INVENTOR
John G. Vergobbi
BY J. Stanley Churchill
ATTORNEY Patented Sept. 16, 1941

2,255,953

UNITED STATES PATENT OFFICE 2,255,953

ORNAMENTAL WRAPPING SHEET AND METHOD OF MAKING THE SAME

John G. Vergobbi, Quincy, Mass., assignor to Pneumatic Scale Corporation, Limited, Quincy, Mass., a corporation of Massachusetts Application October 14, 1938, Serial No. 235,018

2 Claims. (Cl. 41—33)

This invention relates to an ornamental paper suitable for use as a wrapper and to the method of making the same.

The invention has for an object the production of a novel and highly attractive ornamental paper sheet comprising a single ply paper having one surface ornamented by a printed design and possessing a gloss of a character heretofore obtainable in the practice only in those laminated printed sheets embodying a transparent gloss imparting layer as the upper or surfacing lamination of the laminated structure.

A further object of the invention is to provide a novel and efficient method of making the present single ply glossy ornamental paper sheet.

With these objects in view, and such others as may hereinafter appear, the invention consists in the ornamental paper sheet and in the method of making the same hereinafter described and particularly defined in the claims at the end of this specification.

In the drawing illustrating the preferred embodiment of the invention, Fig. 1 is a diagrammatic view of one form of apparatus for practicing the present method of making the present ornamental wrapping sheet; Fig. 2 is a plan view of a portion of an ornamental web embodying the invention, and Fig. 3 is a longitudinal sectional view of a portion of the web shown in Fig. 2.

In general, the invention finds particular use in the production of an ornamental wrapping sheet suitable for use in wrapping a food package to provide the package with a glossy and highly attractive ornamental appearance. Heretofore, as far as I am aware, this result has been obtainable only in those laminated printed wrappers in which the desired gloss has been imparted to the printed or ornamental surface of the wrapper by a covering sheet or layer of a glossy or transparent layer such, for example, as a sheet of "Cellophane" or a sheet of cellulose acetate, adhesively affixed to the wrapper and thus forming a laminated structure. The character of the gloss producing sheet such as the "Cellophane" or cellulose acetate sheet is such, however, that when the laminated structure is used as a wrapper and wrapped about a package, difficulty is experienced in securing satisfactory adhesion between the overlapped or seamed portions of the wrapper, particularly for the reason that organic solvents can not be used on or in connection with a food package. As a result, the practical use of such laminated glossy ornamental wrappers has not been extensive. In addition the extra thickness of a laminated wrapper detracts from the ease of formation of the folds and seams or overlapped portions of the wrapper on the wrapped package.

I have discovered that a single ply ornamental wrapping sheet having the desired glossy appearance may be produced following the procedure now employed in the production of a laminated sheet of the prior art and then separate the transparent sheet, such as the "Cellophane" or cellulose acetate sheet, from the underlying printed paper sheet. This procedure results in the transfer of the printing forming the design from the transparent to the underlying paper sheet and further has the remarkable effect of imparting a glossy appearance to the printed underlying sheet, the exact reason for which is not well understood.

Referring now to the drawing the apparatus shown in Fig. 1 diagrammatically illustrates one form of apparatus which may be employed in practicing the present invention. As herein shown, supply rolls 10, 12 of the wrapping paper and transparent material such as "Cellophane" or cellulose acetate, are mounted so that the webs withdrawn therefrom may pass through pressure rolls 14, 16. Prior to the passage between the pressure rolls 14, 16, the adjacent surface of the tansparent web 17 has the design printed thereon by any usual printing mechanism, illustrated by the printing roller 18 inked from the supply 20. A coating of adhesive or paste may be applied to the transparent web prior to its passage under the printing roller 18 following the procedure set forth in the United States patent to Bryan, No. 1,818,459, to which reference may be had. As therein described, after the printing operation the webs are passed between the pressure rolls 14, 16 and thence around dryers 22 as shown.

In accordance with the present invention, after the webs have been passed through the dryers and before the adhesive has become thoroughly set, the webs are separated, the transparent web being wound up into the roll 30 and the wrapping web being wound up into the roll 32. This procedure results in the complete transfer of the printing from the transparent to the wrapping web, leaving the transparent web in its original unprinted condition ready for use over again in the process. The single ply printed web possesses the desired gloss which heretofore has been obtainable with the multi ply structure of the prior art embodying a "Cellophane" or similar gloss producing surfacing sheet.

While the preferred process of making the present single ply ornamental or printed sheet has been herein illustrated and described, it will be understood that variations may be made therein if found advantageous within the scope of the following claims.

Having thus described the invention, what is claimed is:

1. The method of making a single ply glossy ornamental paper sheet suitable for use as a wrapper, comprising first applying adhesive material to a transparent fibrous web, then printing ornamental designs thereon on top of the adhesive, then superposing a web of single ply paper upon the printed and adhesive surface of the transparent fibrous web, and subjecting the same to pressure, then drying the webs and finally separating the transparent and wrapping webs whereby to form on the wrapping web the printed design previously applied to the transparent web.

2. The process of producing a single ply glossy ornamental paper sheet suitable for use as a wrapper, comprising leading a web of paper from a supply roll thereof to between pressure rolls, leading a transfer web from a supply roll thereof to between said pressure rolls, first applying adhesive and then printing decorative designs upon the inner surface of the transfer web prior to its passage through the pressure rolls, adhesively affixing the webs together during passage between said pressure rolls, then partially drying the adhesive, and finally separating the transfer web from the wrapping web whereby to produce a wrapping web having the designs transferred thereto from the previously printed transfer web.

JOHN G. VERGOBBI.